(12) United States Patent
Kosuda et al.

(10) Patent No.: US 7,149,154 B2
(45) Date of Patent: Dec. 12, 2006

(54) MEDIUM AND METHOD FOR PROVIDING A DESIRABLE DIRECT OVERWRITING CHARACTERISTIC FOR OPTICAL DATA RECORDED AT DIFFERENT LINEAR RECORDING VELOCITIES

(75) Inventors: Masanori Kosuda, Chuo-ku (JP); Masahiro Mori, Chuo-ku (JP)

(73) Assignee: TDK Corporation, Tokyo (JP)

( * ) Notice: Subject to any disclaimer, the term of this patent is extended or adjusted under 35 U.S.C. 154(b) by 255 days.

(21) Appl. No.: 10/354,919

(22) Filed: Jan. 29, 2003

(65) Prior Publication Data

US 2004/0053076 A1   Mar. 18, 2004

(30) Foreign Application Priority Data

Feb. 1, 2002   (JP)   ............... 2002-025618

(51) Int. Cl.
G11B 11/00   (2006.01)

(52) U.S. Cl. ............... 369/13.26; 369/13.04; 369/47.5

(58) Field of Classification Search ............. 369/13.26, 369/13.25, 13.24, 116, 13.28, 275.2, 13.04; 430/270.13; 428/64.4, 64.1
See application file for complete search history.

(56) References Cited

U.S. PATENT DOCUMENTS

| | | | | |
|---|---|---|---|---|
| 5,276,670 A | * | 1/1994 | Nogami et al. ............. | 369/116 |
| 5,848,043 A | * | 12/1998 | Takada et al. ............. | 369/116 |
| 6,096,400 A | * | 8/2000 | Inoue et al. ............... | 428/64.1 |
| 6,154,437 A | * | 11/2000 | Utsunomiya et al. .... | 369/275.2 |
| 6,459,666 B1 | * | 10/2002 | Yokoi ......................... | 369/116 |
| 6,770,346 B1 | * | 8/2004 | Harigaya et al. .......... | 428/64.1 |
| 6,886,177 B1 | * | 4/2005 | Katoh et al. ............. | 369/275.2 |
| 2002/0105875 A1 | * | 8/2002 | Ushiyama et al. ......... | 369/53.3 |
| 2003/0086345 A1 | * | 5/2003 | Ueki ....................... | 369/47.51 |
| 2006/0044968 A1 | * | 3/2006 | Narumi et al. ............. | 369/47.5 |

FOREIGN PATENT DOCUMENTS

JP   2002-245663   8/2002

* cited by examiner

*Primary Examiner*—Tan Dinh
(74) *Attorney, Agent, or Firm*—Seed IP Law Group PLLC

(57) ABSTRACT

It is an object of the present invention to provide a method for recording information in an optical recording medium with a good direct overwriting characteristic. The method for recording information in an optical recording medium according to the present invention forms record marks in a recording layer containing a phase change material by modulating the power of a laser beam between a plurality of power levels including a recording power Pw, an erasing power Pe and ground power Pb. The erasing power Pe is set to a level within a region where a reflection coefficient of a region between neighboring record marks approaches a reflection coefficient of the record mark as the erasing power Pe increases. As a result, a good overwriting characteristic can be obtained when data are recorded at a high linear velocity.

10 Claims, 7 Drawing Sheets

LASER BEAM

MEDIUM AND METHOD FOR PROVIDING A DESIRABLE DIRECT OVERWRITING CHARACTERISTIC FOR OPTICAL DATA RECORDED AT DIFFERENT LINEAR RECORDING VELOCITIES

BACKGROUND OF THE INVENTION

The present invention relates to a method for recording data in an optical recording medium and, particularly, to a method for recording data in a rewritable type optical recording medium whose recording layer contains a phase change material. The present invention also relates to an optical recording medium and, particularly, to a rewritable type optical recording medium whose recording layer contains a phase change material.

DESCRIPTION OF THE PRIOR ART

Optical recording media such as the CD, DVD and the like have been widely used as recording media for recording digital data and a data recording method for recording data by modulating data to be recorded into lengths of record marks along a track has been widely used. For example, in a DVD-RW, which is a kind of optical recording media in which data can be rewritten by a user, record marks whose lengths correspond to 3T to 11T and 14 T, where T is a clock period, are used for recording data.

When such record marks are to be formed, a laser beam is projected on the optical recording medium along its track, whereby an amorphous region of a predetermined length to be used as a record mark is formed in a recording layer formed of a phase change material in the optical recording medium. Regions other than the amorphous region are crystallized.

When a record mark is to be formed in the recording layer, a laser beam whose power has been set at a sufficiently high level, namely, a recording power Pw, is projected onto the recording layer to heat it to a temperature higher than the melting point thereof and the recording layer is then quickly cooled by changing the power of the laser beam to a sufficiently low level, namely, a ground power Pb. As a result, the phase of the phase change material is changed from a crystal phase to an amorphous phase, thereby forming a record mark. On the other hand, when a record mark is to be erased, a laser beam whose power has been set to a level equal to or lower than the recording power Pw and equal to or higher than the ground power Pb, namely, an erasing power Pe, is projected onto the recording layer to heat it up to a temperature equal to or higher than the crystallization temperature thereof and the recording layer is gradually cooled, whereby the phase of the phase change material is changed from an amorphous phase to a crystal phase and the record mark is erased. Therefore, it is possible not only to form a record mark in an unrecorded region of the recording layer but also to directly overwrite a record mark with a different record mark in a recorded region by modulating the power of the laser beam between a plurality of levels including the recording power Pw, the erasing power Pe and the ground power Pb.

The optimum level of the erasing power Pe mainly depends upon the composition of the phase change material contained in the recording layer as a primary component and, therefore, the optimum level of the erasing power Pe generally changes depending upon the composition of the phase change material contained in the recording layer. For this reason, when an optical recording medium is designed, ordinarily a mixed signal for forming a plurality of record marks is recorded onto the same track of a prototype optical recording medium a plurality of times and the erasing power Pe at which a reflection coefficient of a blank region between record marks neighboring in the direction of a track becomes saturated is determined to be the optimum level of the erasing power Pe.

SUMMARY OF THE INVENTION

However, the inventors of the present invention vigorously pursued a study and, as a result, made the discovery that in the case where the erasing power Pe determined by this method is used, jitter of overwritten data may not be good depending upon the linear velocity of data recording (recording linear velocity). Therefore, a good direct overwriting characteristic can be obtained at a certain recording linear velocity while a good direct overwriting characteristic cannot be obtained at another recording linear velocity.

It is therefore an object of the present invention to provide a method for recording data in an optical recording medium with a good direct overwriting characteristic and an optical recording medium in which data can be recorded with a good direct overwriting characteristic.

It is another object of the present invention to provide a method for recording data in an optical recording medium with a good direct overwriting characteristic irrespective of recording linear velocity and an optical recording medium in which data can be recorded with a good direct overwriting characteristic irrespective of recording linear velocity.

In a study carried out by the inventors of the present invention, it was found that even if the recording layers have the exactly the same composition, the relationship between the erasing power Pe and the reflection coefficient of a blank region between record marks neighboring in the direction of a track greatly changes depending upon the recording linear velocity.

FIG. 1 is a graph schematically showing the relationship between the erasing power Pe and reflection coefficient of a region between record marks neighboring in the direction of a track at a low recording linear velocity and shows the reflection coefficient of the region between record marks neighboring in the direction of a track after a mixed signal for forming a plurality of record marks was recorded on the same track of the optical recording medium a plurality of times under various levels of the erasing power Pe.

The area indicated by the symbol ① in FIG. 1 is an area that remained mostly in an amorphous phase since the erasing power Pe of the laser beam was too weak and the temperature of the recording layer did not reach the crystallization temperature thereof. Therefore, if the actual erasing power Pe of the laser beam is set to a level within this area, record marks cannot be completely erased. The area indicated by a symbol ② in FIG. 1 is an area in which substantially all of the amorphous region was crystallized since the temperature of the recording layer reached the crystallization temperature thereof. Therefore, if the actual erasing power Pe of the laser beam is set to a level within this area, record marks can be erased while maintaining their solid phase. The area indicated by the symbol ④ in FIG. 1 is an area in which substantially all of the amorphous region was crystallized since the temperature of the recording layer reached the melting point thereof. Therefore, if the actual erasing power Pe of the laser beam is set to a level within this area, record marks can be melted and erased.

The area indicated by the symbol ③ in FIG. 1 is an area located between the area ② and the area ④ and in which substantially all of the amorphous region was crystallized since the temperature of the recording layer partly reached the melting point thereof. Therefore, if the actual erasing power Pe of the laser beam is set to a level within this area, record marks can be erased in a mode between the solid-state erasure and the melt-quench erasure.

In the case where the direct overwriting is conducted at the linear velocity (low linear velocity) at which the relationship between the erasing power Pe and the reflection coefficient of a region between the record marks neighboring in the direction of a track is as shown in FIG. 1, jitter property can be improved by setting the actual erasing power Pe to a level within the areas ② to ④.

FIG. 2 is a graph schematically showing the relationship between the erasing power Pe and reflection coefficient of a region between record marks neighboring in the direction of a track at a high recording linear velocity and, similarly to FIG. 1, shows the reflection coefficient of a region between record marks neighboring in the direction of a track after a mixed signal for forming a plurality of record marks was recorded on the same track of the optical recording medium a plurality of times under various levels of the erasing power Pe.

As can be seen from FIG. 2, when the recording linear velocity was high, the reflection coefficient of a region between record marks neighboring in the direction of a track decreased in the area ③. In the area ③, an area where the reflection coefficient of the region between record marks neighboring in the direction of a track decreased as the erasing power Pe increased is referred to as area "③-A" and an area where the reflection coefficient of the region between record marks neighboring in the direction of a track increased as the erasing power Pe increased is referred to as area "③-B." The inventors of the present invention found that jitter property can be most improved by setting the actual erasing power Pe to a level within the area "③-A."

Although the reason why jitter property can be most improved by setting the actual erasing power Pe within the area "③-A" is not clear, it is reasonable to conclude that since the recording layer begins to be melted by a laser beam whose erasing power Pe is in the area "③-A," record marks not sufficiently erased by the solid-state erasure at a high linear velocity in the area ② can be desirably erased.

The present invention is directed to solving the above described problems based on this finding. A method for recording data in an optical recording medium according to one aspect of the present invention is adapted for recording data in an optical recording medium including a recording layer containing a phase change material by projecting a laser beam thereonto and comprises the steps of projecting the laser beam onto the recording layer so that the portion of the recording layer onto which the laser beam impinges is continuously moved and modulating the power of the laser beam between a plurality of power levels including at least an erasing power, thereby recording a plurality of record marks in the recording layer, the level of the erasing power being set to a level within an area where a reflection coefficient of a region between record marks neighboring in the direction of a track approaches a reflection coefficient of the record mark as the erasing power increases.

According to this aspect of the present invention, a good overwriting characteristic can be obtained when data are recorded at a high linear velocity, thereby improving jitter property of the thus formed record mark.

In a preferred aspect of the present invention, the plurality of power levels includes a recording power whose level is higher than that of the erasing power and a ground power whose level is lower than that of the erasing power.

In a preferred aspect of the present invention, the optical recording medium is constituted as a "high-to-low" type and the level of the erasing power is set to a level within which the reflection coefficient of a region between record marks neighboring in the direction of a track decreases as the erasing power increases.

A method for recording data in an optical recording medium according to another aspect of the present invention is adapted for recording data in an optical recording medium including a recording layer containing a phase change material by projecting a laser beam thereonto and comprises the steps of projecting the laser beam onto the recording layer so that the portion of the recording layer onto which the laser beam impinges is continuously moved and modulating the power of the laser beam between a plurality of power levels including at least an erasing power, thereby recording a plurality of record marks in the recording layer, the level of the erasing power being set to higher than a level within an area where the reflection coefficient of the region between the record marks neighboring in the direction of a track is not substantially changed even if the erasing power increases and lower than a level within an area where the reflection coefficient of the region between the record marks neighboring in the direction of a track moves away from that of the record mark as the erasing power increases.

A method for recording data in an optical recording medium according to a further aspect of the present invention is adapted for recording data in an optical recording medium by modulating the power of a laser beam between a plurality of power levels including at least erasing power and recording record marks in a recording layer containing a phase change material wherein the erasing power is set to a first level when data are to be recorded at a first linear velocity and the erasing power is set to a second level different from the first level when data are to be recorded at a second linear velocity higher than the first linear velocity. According to this aspect of the present invention, multi-velocity recording of data can be accomplished for an optical recording medium.

In a preferred aspect of the present invention, the first linear velocity is set so that the reflection coefficient of the region between recording marks neighboring in the direction of a track becomes substantially saturated when the erasing power is set to be equal to or higher than a predetermined level and the second linear velocity is set so that the reflection coefficient of the region between the record marks neighboring in the direction of a track approaches the reflection coefficient of the record mark as the erasing power increases when data are recorded at the second linear velocity.

In a further preferred aspect of the present invention, the first level is set so that the reflection coefficient of the region between the record marks neighboring in the direction of a track becomes equal to a first value and the second level is set so that the reflection coefficient of the region between the record marks neighboring in the direction of a track becomes equal to a second value closer to the reflection coefficient of the record mark than the first value is.

An optical recording medium according to one aspect of the present invention is provided with a recording layer which contains a phase change material and in which record marks are to be formed by irradiation with a laser beam and with predetermined information necessary for setting an erasing power of the laser beam to a level within an area where a reflection coefficient of a region between record marks neighboring in the direction of a track approaches the reflection coefficient of the record mark as the erasing power increases.

An optical recording medium according to another aspect of the present invention is provided with a recording layer which contains a phase change material and in which record marks are to be formed by irradiation with a laser beam, and with first predetermined information necessary for setting a level of an erasing power corresponding to a first recording linear velocity and second predetermined information necessary for setting a level of the erasing power corresponding to a second recording linear velocity higher than the first recording linear velocity.

In a preferred aspect of the present invention, when data are recorded at the first recording linear velocity, the reflection coefficient of the region between the record marks neighboring in the direction of a track becomes equal to a first value and when data are recorded at the second recording linear velocity, the reflection coefficient of the region between record marks neighboring in the direction of a track becomes equal to a second value that is closer to the reflection coefficient of the record mark than the first value is.

The above and other objects and features of the present invention will become apparent from the following description made with reference to the accompanying drawings.

DESCRIPTION OF THE PREFERRED EMBODIMENTS

Hereinafter, a preferred embodiment of the present invention will be described in detail with reference to accompanying drawings.

Figure 3:
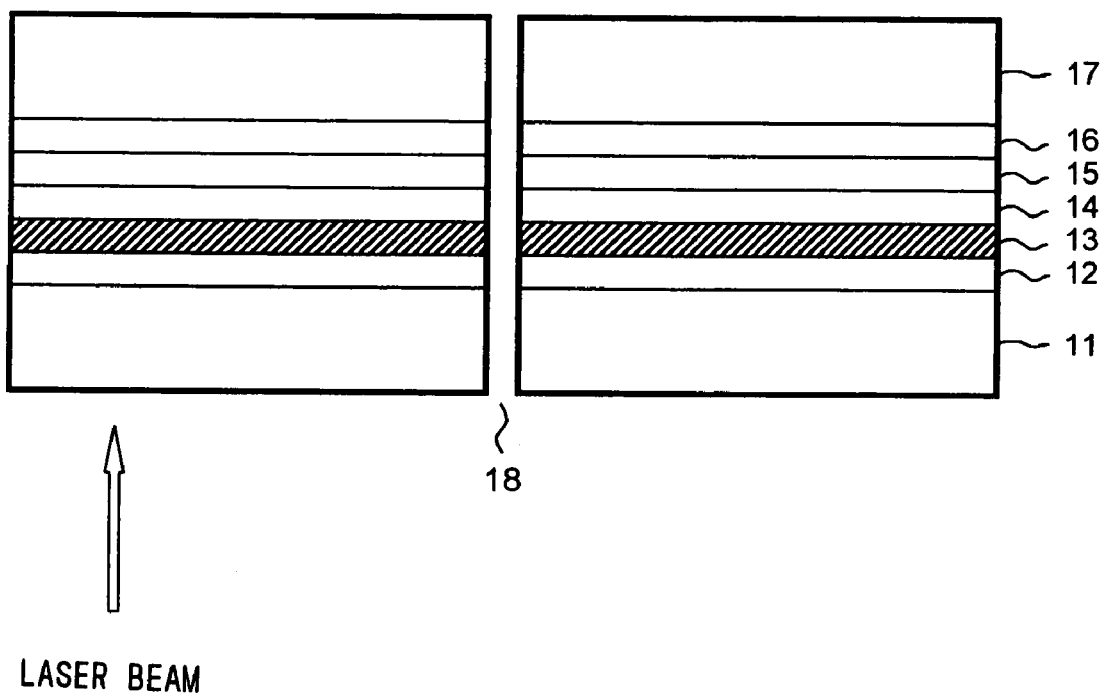
FIG. 3 is a cross-sectional view schematically showing the structure of an optical recording medium 10 which is a preferred embodiment of the present invention.

FIG. 3 is a cross-sectional view schematically showing the structure of an optical recording medium 10 that is a preferred embodiment of the present invention, the structure being shown for the case where the present invention is applied to a DVD type optical recording medium. As explained later, the optical recording medium to which a method for recording data according to the present invention can be applied is not limited to the DVD type optical recording medium shown in FIG. 3 but may be an optical recording media having another structure.

As shown in FIG. 3, an optical recording medium 10 according to this embodiment is constituted by a translucent substrate 11, a first dielectric layer 12 provided on the translucent substrate 11, a recording layer 13 provided on the first dielectric layer 12, a second dielectric layer 14 provided on the recording layer 13, a reflective layer 15 provided on the second dielectric layer 14, a protective layer 16 provided on the reflective layer 15 and a dummy substrate 17 provided on the protective layer 16 via an adhesive layer (not shown) and the central portion of the optical recording medium 10 is formed with a hole 18. In the optical recording medium 10 having such configuration, data are recorded or reproduced by projecting a laser beam from the side of the translucent substrate 11.

The translucent substrate 11 constitutes an incident surface of the laser beam and has a thickness of about 0.6 mm. The surface of the translucent substrate 11 on the opposite side from the incident surface is formed with pregrooves (not shown). The material for forming the translucent substrate 11 is not particularly limited and polycarbonate can be used for forming the translucent substrate 11.

The first dielectric layer 12 mainly serves as a protective layer for the recording layer 13 formed thereabove and preferably has a thickness of 40 to 250 nm. The material for forming the first dielectric layer 12 is not particularly limited and the first dielectric layer 12 can be formed of an oxide, nitride, sulfide or carbide of silicon (Si), aluminum (Al), tantalum (Ta), zinc (Zn) or the like, such as $SiO_2$, $Si_3O_4$, $Al_2O_3$, AlN, TaO, ZnS.

The recording layer 13 is formed of a phase change material and data are recorded in the recording layer 13 utilizing difference in reflection coefficients between crystalline structure and amorphous structure. A region of the recording layer 13 can be changed from a crystalline state to an amorphous state by modulating the power of the laser beam projected from the side of the translucent substrate 11 in accordance with a pulse wave having an amplitude between a recording power Pw and a ground power Pb, heating the region of the recording layer 13 to a temperature equal to or higher than the melting point thereof and quickly cooling the region. As a result, the region of the recording layer 13 melted by the laser beam having the recording power Pw is changed to an amorphous state, thereby forming a record mark. On the other hand, a region of the recording layer 13 can be changed from an amorphous state to a crystalline state by projecting the laser beam having an erasing power Pe from the side of the translucent substrate 11 and heating the region of the recording layer 13 to a temperature equal to or higher than the crystallization temperature thereof. The region heated to a temperature equal to or higher than the crystallization temperature by the laser 4 beam having the erasing power Pe is gradually cooled and the region is changed to a crystalline state.

The recording power Pw, the erasing power Pe and the ground power Pb are set so that the erasing power Pe is lower than the recording power Pw and equal to or higher than the ground power Pb.

Therefore, it is possible not only to form a record mark at an unrecorded region of the recording layer 13 but also to directly overwrite a record mark with a different record mark in a recorded region by modulating the power of the laser beam between a plurality of levels including the recording power Pw, the erasing power Pe and the ground power Pb.

The material for forming the recording layer 13 is not particularly limited but an SbTe system material is preferably used for forming the recording layer 13. As the SbTe system material, SbTe may be used alone or InSbTeGe, AgInSbTe, AgInSbTeGe containing indium (In), tellurium (Te), germanium (Ge) or the like as an additive may be used. The recording layer 13 preferably has a thickness of 10 to 30 nm.

Similarly to the first dielectric layer 12, the second dielectric layer 14 mainly serves as a protective layer for the recording layer 13 and the thickness of the second dielectric layer 14 is preferably 5 to 200 nm, more preferably 10 to 30 nm. The material for forming the second dielectric layer 14 is not particularly limited and the second dielectric layer 12 can be formed of an oxide, nitride, sulfide or carbide of silicon (Si), aluminum (Al), tantalum (Ta), zinc (Zn) or the like, such as $SiO_2$, $Si_3O_4$, $Al_2O_3$, AlN, TaO, ZnS.

The reflective layer 15 serves to reflect the laser beam projected from the side of the translucent substrate 11 and to emit it through the translucent substrate 11, and preferably has a thickness of 20 to 400 nm. The material for forming the reflective layer 15 is not particularly limited but the reflective layer 15 may be preferably formed of alloy containing silver (Ag) or aluminum (Al) and be formed of gold (Au), platinum (Pt) or the like.

The first dielectric layer 12, the recording layer 13, the second dielectric layer 14 and the reflective layer 15 can be formed by sputtering on the surface of the translucent substrate 11 on which the pregrooves (not shown) are formed.

The protective layer 16 serves to physically and chemically protect the reflective layer 15 and preferably has a thickness of 5 to 50 μm. The material for forming the protective layer 16 is not particularly limited but acrylic resin is preferably used for forming the protective layer 16.

The dummy substrate 17 serves to ensure the mechanical strength required by the optical recording medium 10 and helps to ensure the thickness (about 1.2 mm) required by the optical recording medium 10. It has a thickness of about 0.6 mm. The material for forming the protective layer 17 is not particularly limited but polycarbonate can be used for forming the dummy substrate 17. The dummy substrate 17 is adhered onto the translucent substrate 11 formed with the first dielectric layer 12, the recording layer 13, the second dielectric layer 14, the reflective layer 15 and the protective layer 16 thereon via an adhesive layer (not shown), thereby forming the optical recording medium 10. If the reflective layer 15 can be protected by the adhesive layer, the protective layer 16 can be omitted. The adhesive agent used for forming the adhesive layer is not particularly limited but acrylic resin curable by radical polymerization or cation polymerization in accordance with the object of the adhesive layer and/or the method of fabricating the optical recording medium 10 may be used for forming the adhesive layer.

The optical recording medium 10 shown in FIG. 3 is one example of the optical recording media of the present invention and of an optical recording medium to which the recording data methods of the present invention can be applied; the optical recording medium according to the present invention and the optical recording medium to which the recording data methods of the present invention can be applied are not limited to the optical recording medium 10 shown in FIG. 3 and having the above described structure and may be optical recording media having another structure.

For example, the present invention can be applied to a DVD type optical recording medium fabricated by bonding two translucent substrates 11, each being formed thereon with the first dielectric layer 12, the recording layer 13, the second dielectric layer 14, the reflective layer 15 and the protective layer 16. Further, the present invention can be also applied to a CD type optical recording medium having a translucent substrate having a thickness of about 1.1 mm and no dummy substrate. Moreover, the present invention can be applied to a next-generation type optical recording medium fabricated by employing a dummy substrate having a thickness of about 1.1 mm and formed with pregrooves thereon and providing a very thin light transmission layer having a thickness of 10 to 300 nm instead of the translucent substrate 11.

An overview of a method for recording data in the thus constituted optical recording medium 10 will now be set out.

Although the method is not particularly limited, an 8, 16 modulation method can be used for recording data in the optical recording medium 10 according to this embodiment. In the 8, 16 modulation method, data to be recorded are modulated to record marks having lengths corresponding to 3T to 11T and 14T, where T is one clock period. The modulation method is not limited to the 8, 16 modulation method and data can also be recorded by other modulation methods such as the (1, 7) RLL modulation method.

Next, one example of a pulse pattern of a laser beam used in the 8, 16 modulation method will be described.

Figure 4:
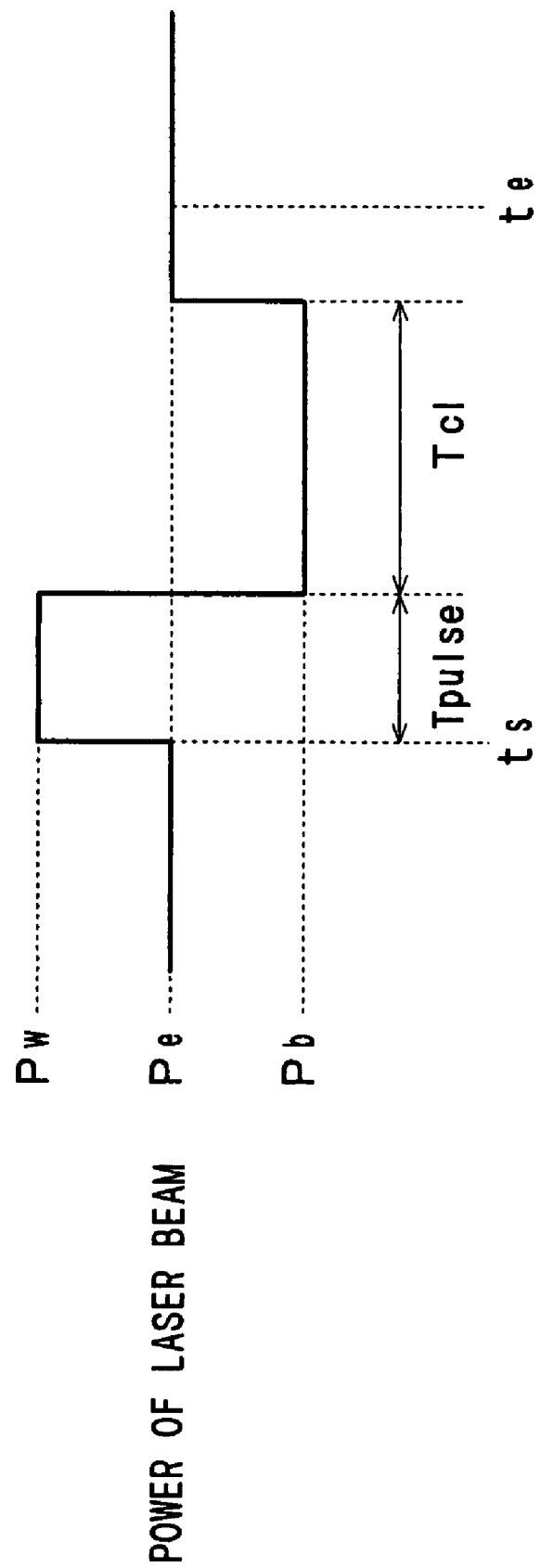
FIG. 4 is a diagram showing one example of a pulse pattern of a laser beam for forming record marks whose length corresponds to 3T.

FIG. 4 is a diagram showing a pulse pattern of a laser beam used for forming a record mark whose length corresponds to 3T.

As shown in FIG. 4, in the case of forming a record mark whose length corresponds to 3T, the number of pulses of the laser beam is set to "1". The number of pulses of the laser beam is defined by how many times the power of the laser beam is increased to Pw. More specifically, assuming that the time when the laser beam is located at the start point of a record mark is ts and the time when the laser beam is located at the terminal end point of the record mark is te, the power of the laser beam is once increased to Pw and then lowered to Pb. The power of the laser beam is set to be Pe before ts and the increase of the power of the laser beam is started at ts. The power of the laser beam at te is set to Pe or Pb.

In the period of Tpulse, high energy is imparted to the recording layer 13 of the optical recording medium 10 and the temperature of the recording layer 13 exceeds the melting point thereof, and in the period Tcl, the recording layer 13 of the optical recording medium 10 is quickly cooled. As a result, a record mark whose length corresponds to 3T is formed in the recording layer 13 of the optical recording medium 10.

In the case of forming record marks having different lengths, similarly to the case of forming a record mark whose length corresponds to 3T, the power of the laser beam for recording data is modulated to Pw, Pe or Pb and a record mark having a desired length is formed by (n−2) number of pulses, where n is a multiple of T and can assume one of 3 to 11 and 14.

Next, the method of setting the erasing power Pe in this embodiment will be described.

As described above, the erasing power Pe is generally set so that, irrespective of the recording linear velocity, the level of the erasing power Pe at which a reflection coefficient of a region (blank region) between record marks neighboring in the direction of a track becomes saturated is optimum. However, in the case of overwriting data using a pulse pattern of the laser beam designed using the erasing power Pe set in this manner, jitter of overwritten data may become worse depending upon the recording linear velocity. Therefore, in this embodiment, the erasing power Pe is set by a different method from that in which the erasing power Pe is set based on the saturation of the reflection coefficient so that jitter of overwritten data is smallest and the erasing power Pe is set in the following manner.

The erasing power Pe is first set at a predetermined level and a mixed signal for forming a plurality of record marks is recorded on the same track a plurality of times. It is preferable to set the number of overwirtings in accordance with Part 1 (PHYSICAL SPECIFICATIONS) of DVD Specifications for Re-recordable Disk and record the mixed signal on the same track ten times.

The reflection coefficients of the track are then measured and the highest reflection coefficient among the thus measured reflection coefficients is defined as the reflection coefficient corresponding to the erasing power Pe. In this case, since the record marks are in the amorphous state and have low reflection coefficients, the highest reflection coefficient must be obtained from a region (blank region) between record marks neighboring in the direction of a track.

Figure 1:
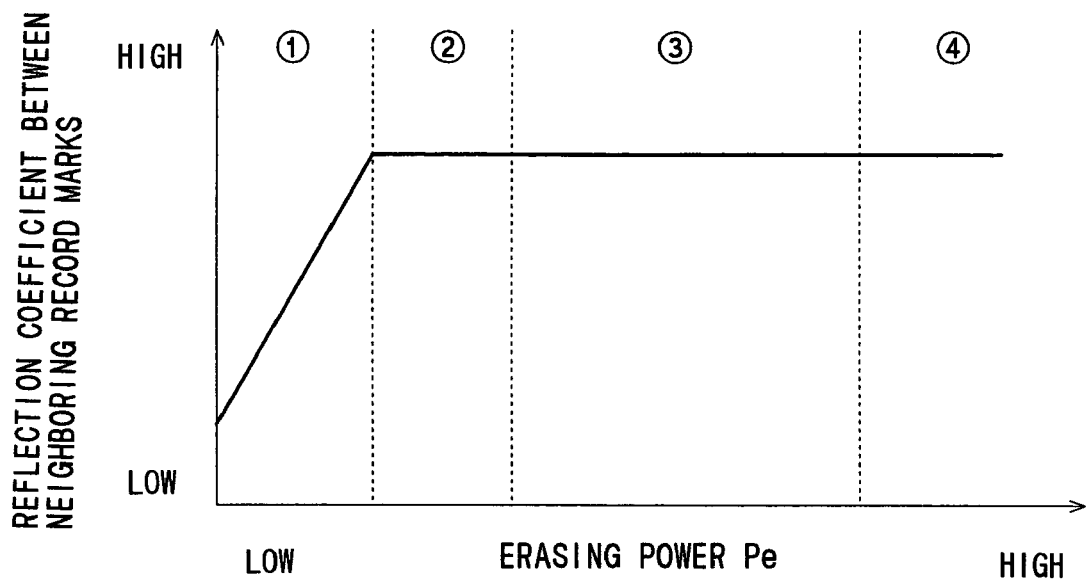
FIG. 1 is a graph schematically showing the relationship between erasing power Pe and reflection coefficient of a region between record marks neighboring in the direction of a track at a low recording linear velocity.
Figure 2:
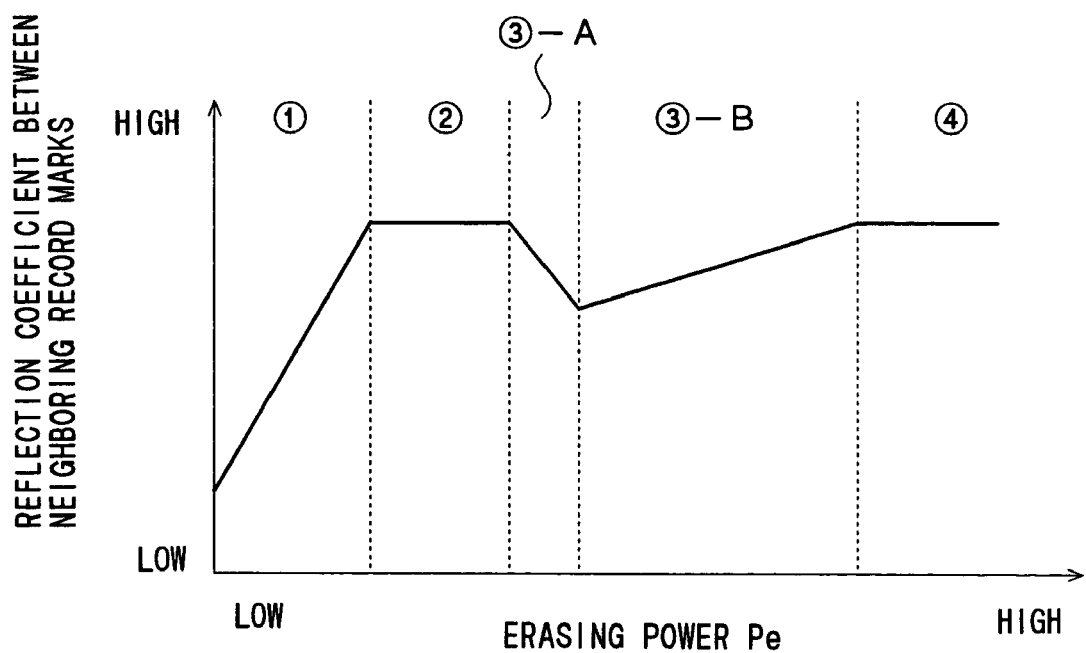
FIG. 2 is a graph schematically showing the relationship between erasing power Pe and reflection coefficient of a region between record marks neighboring in the direction of a track at a high recording linear velocity.

This operation is conducted at a fixed recording linear velocity by varying the erasing power Pe and it is judged whether the relationship between the erasing power Pe and the highest reflection coefficient coincides with that shown in FIG. 1 or that shown in FIG. 2. If the relationship between the erasing power Pe and the highest reflection coefficient coincides with that shown in FIG. 1, in which the reflection coefficient hardly changes over the area ② where record marks are erased by the solid state erasure to the area ④ where record marks are erased by the melt-quench erasure and the reflection coefficient is substantially saturated in the area ②, the level of the erasing power Pe may be set to a level within the areas ② to ④. On the other hand, if the relationship between the erasing power Pe and the highest reflection coefficient coincides with that shown in FIG. 2, in which the reflection coefficient decreases substantially in the area ③ between the area ② where record marks are erased by the solid state erasure and the area ④ where record marks are erased by the melt-quench erasure and the reflection coefficient is substantially saturated in the area ②, the level of the erasing power Pe may be set to a level within the area ③-A. However, in the case where the relationship between the erasing power Pe and the highest reflection coefficient coincides with that shown in FIG. 1, since it is impossible to distinguish the areas ② to ④ based on the value of the highest reflection coefficient, it is preferable to set the level of the erasing power Pe to slightly higher than the level at which the reflection coefficient is saturated, normally, 1.2 to 1.85 times the level at which the reflection coefficient is saturated.

Therefore, when the result of measuring the relationship between the erasing power Pe and the highest reflection coefficient at various recording linear velocities is that the relationship between the erasing power Pe and the highest reflection coefficient coincides with that shown in FIG. 1 at a first recording velocity and the relationship between the erasing power Pe and the highest reflection coefficient coincides with that shown in FIG. 2 at a second recording velocity, jitter property can be improved at each of the first recording linear velocity and the second recording linear velocity by setting the level of the erasing power Pe to the level of a first erasing power in the areas ② to ④ in the case of using the optical recording medium 10 at the first recording linear velocity and setting the level of the erasing power Pe to the level of a second erasing power in the area ③-A. Therefore, it is possible to provide an optical recording medium adapted for multiple velocities.

Figure 5:
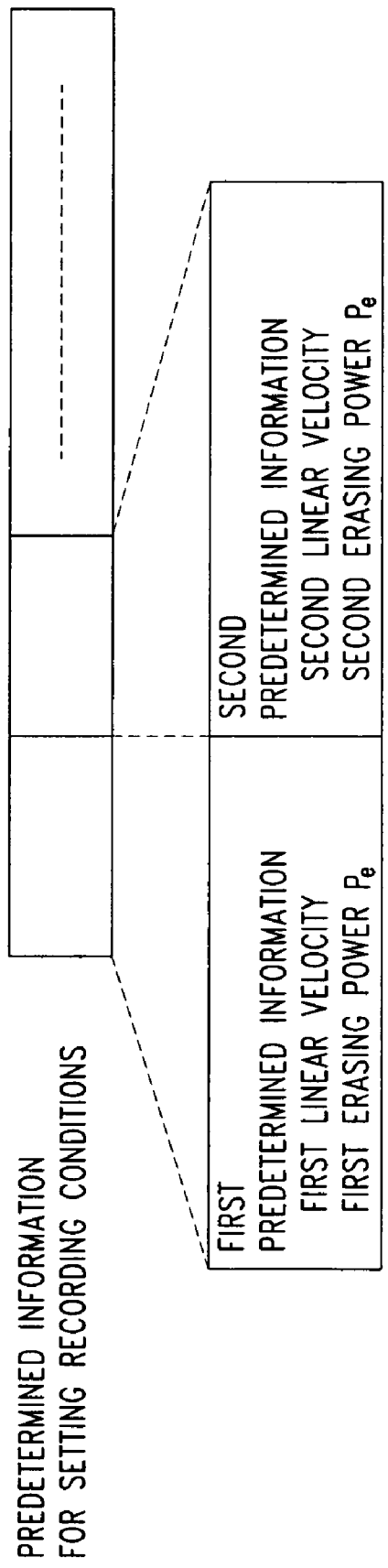
FIG. 5 is a diagram showing one example of information for setting recording conditions.

It is preferable to store the thus set level of the erasing power Pe together with the corresponding recording linear velocity in the optical recording medium 10 as "predetermined information for setting recording conditions". If such predetermined information for setting recording conditions is stored in the optical recording medium 10, the predetermined information for setting recording conditions can be read out by a drive when a user actually records data and, therefore, it is possible to adjust the erasing power Pe based on the thus read predetermined information for setting recording conditions. For example, as shown in FIG. 5, if the predetermined information for setting recording conditions includes first predetermined information corresponding to the first recording linear velocity and second predetermined information corresponding to the second recording linear velocity, when the user issues an instruction to record data at the first recording linear velocity, the level of the erasing power Pe in the drive is set to the level of the first erasing power based on the first predetermined information, and when the user issues and instruction to record data at the second recording linear velocity, the level of the erasing power Pe in the drive is set to the level of the second erasing power based on the second predetermined information.

It is preferable for the predetermined information for setting recording conditions to include, in addition to the level of the erasing power Pe and the corresponding recording linear velocity, information necessary for identifying various conditions such as the pulse pattern required for recording data in the optical recording medium 10. The predetermined information for setting recording conditions may be recorded as wobbles or prepits and may be recorded in the recording layer 13. The predetermined information for setting recording conditions is not limited to information directly indicating respective conditions necessary for recording data but may be information which can indirectly identify recording conditions by specifying one of the conditions stored in the drive in advance based thereon.

As described above, according to this embodiment, in the case of recording data at a linear velocity at which an area where the reflection coefficient of a region between record marks neighboring in the direction of a track appears between the region where the record mark is erased by the solid state erasure and the area where the record mark is erased by the melt-quench erasure, since the erasing power Pe is set to a level within an area where the reflection coefficient of a region between record marks neighboring in the direction of a track decreases as the erasing power Pe increases and the pulse pattern of the laser beam is designed based on the thus set erasing power Pe, a good direct overwriting characteristic can be obtained.

The present invention has thus been shown and described with reference to specific embodiments. However, it should be noted that the present invention is in no way limited to the details of the described arrangements but changes and modifications may be made without departing from the scope of the appended claims.

Figure 6:
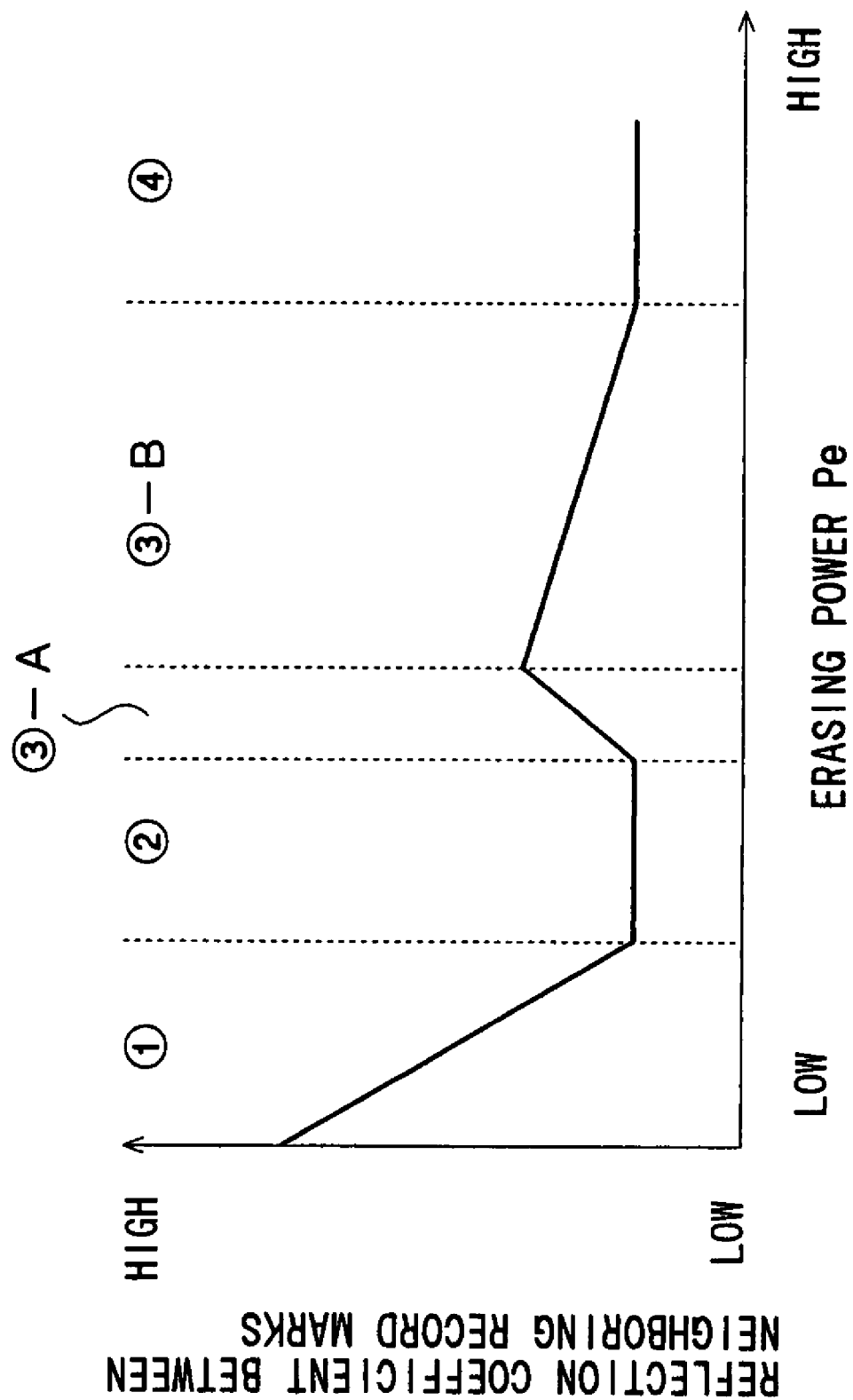
FIG. 6 is a graph schematically showing how reflection coefficient of a region between record marks neighboring in the direction of a track varies with magnitude of erasing power Pe at high linear velocity in a low-to-high type optical recording medium.

For example, in the above described embodiment, although explanation was made as to the case where the present invention is applied to a so-called "high-to-low" type optical recording medium whose reflection coefficient is lowered by the formation of a record mark (amorphous record mark), the present invention can be applied to a so-called low-to-high type optical recording medium in which the reflection coefficient of a recording layer is increased by the formation of a record mark. In this case, as shown in FIG. 6, the erasing power Pe is set to a level within the area ③-A. At any rate, in both the case of applying the present invention to a "high-to-low" type optical recording medium and the case of applying the present invention to a "low-to-high" type optical recording medium, it is sufficient to set the erasing power to a level within an area where the reflection coefficient of a region between record marks neighboring in the direction of a track approaches the reflection coefficient of a record mark as the erasing power is increased.

As described above, according to the present invention, a good direct overwriting characteristic can be obtained.

A good overwrite shelf characteristic, namely, a good rewritable characteristic of a data recorded portion after long-term storage, is required in a rewritable phase change type optical recording medium. According to the present invention, a good overwrite shelf characteristic can be ensured even in the case of conducting direct overwriting at a high linear velocity since the erasing power is raised to higher than usual by setting it to a level within an area where the reflection coefficient of a region between record marks neighboring in the direction of a track approaches the reflection coefficient of a record mark as the erasing power increases.

WORKING EXAMPLES

Working Example 1

An optical recording medium sample having the structure shown in FIG. 2 was fabricated so as to include a translucent substrate 11 formed of polycarbonate and having a thickness of about 0.6 mm, a first dielectric layer 12 formed of a mixture of ZnS and $SiO_2$ and having a thickness of about 80 nm, a recording layer 13 formed of AgInSbTeGe and having a thickness of about 15 nm, a second dielectric layer 14 formed of a mixture of ZnS and $SiO_2$ and having a thickness of about 20 nm, a reflective layer 15 formed of alloy containing aluminum as a primary component and having a thickness of about 120 nm, a protective layer 16 formed of ultraviolet ray curable resin and having a thickness of about 5 μm and a dummy substrate 17 formed of polycarbonate and having a thickness of about 0.6 mm. The optical recording medium sample was fabricated by using a sputtering process to sequentially form the first dielectric layer 12, the recording layer 13, the second dielectric layer 14 and the reflective layer 15 on the surface of the translucent substrate 11 formed with pregrooves, using a spin coating method to form the protective layer 16 on the reflective layer 15, and bonding the dummy substrate 17 on the translucent substrate 11 formed with the first dielectric layer 12, the recording layer 13, the second dielectric layer 14, the reflective layer 15 and the protective layer 16.

A mixed signal for forming a plurality of record marks was recorded in a predetermined track of the thus fabricated optical recording medium sample by fixing the erasing power Pe of the laser beam at a predetermined level in accordance with the conditions shown in Table 1. As shown in Table 1, the recording linear velocity was 3.5 m/sec (DVD uniform velocity).

TABLE 1

| Clock frequency | 26.16 MHz |
|---|---|
| Clock period (1T) | 38.2 nsec |
| Linear velocity | 3.5 m/sec |
| Modulation method | 8, 16 modulation |
| Data transfer rate (considering efficiency) | 11.08 Mbps |
| Channel bit length | 0.133 μm |
| Numerical aperture (NA) | 0.6 |
| Wavelength of a laser beam | 660 nm |

Then, the mixed signal for forming a plurality of record marks was recorded on the same track nine times in accordance with the conditions shown in Table 1 and thereafter, clock jitter of the recorded mixed signal was measured. The fluctuation σ of a reproduced signal was measured using a time interval analyzer and the clock jitter was calculated as σ/Tw, where Tw was one clock period.

The recording of the mixed signal and the measurement of jitter were repeated using various pulse patterns of the laser beam and the pulse pattern at which jitter was lowest was identified.

Reflection coefficients of the track in which the mixed signal had been recorded by the pulse pattern at which jitter was lowest were measured and the highest reflection coefficient was defined as a reflection coefficient corresponding to the erasing power Pe. The highest reflection coefficient was measured in a region (blank region) between neighboring record marks.

This operation was repeated at the recording linear velocity of 3.5 m/sec using various erasing powers Pe and the highest reflection coefficient corresponding to each of the erasing powers Pe was measured.

Figure 7:
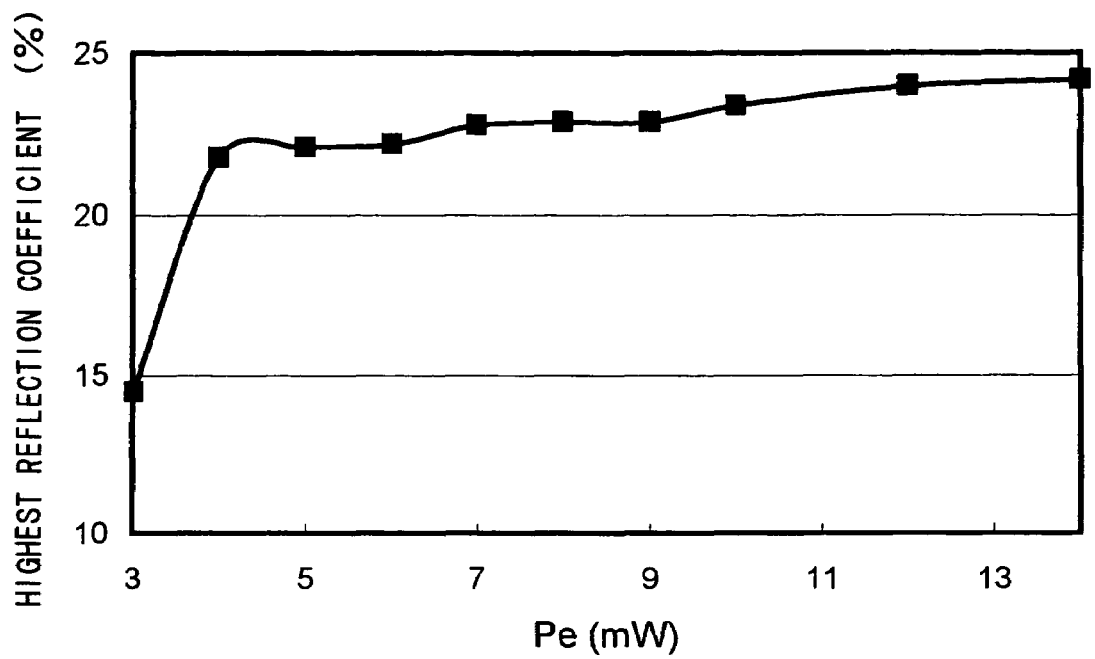
FIG. 7 is a graph showing how the highest reflection coefficient varies with magnitude of erasing power Pe at recording linear velocity of 3.5 m/sec.

FIG. 7 is a graph showing how the highest reflection coefficient varied with magnitude of the erasing power Pe at the recording linear velocity of 3.5 m/sec. As shown in FIG. 7, when the recording linear velocity was 3.5 m/sec, the highest reflection coefficient was substantially saturated in the area where the erasing power Pe was equal to or higher than about 4.5 mW and it was found that the relationship between the erasing power Pe and the highest reflection coefficient was similar to that shown in FIG. 1.

Figure 8:
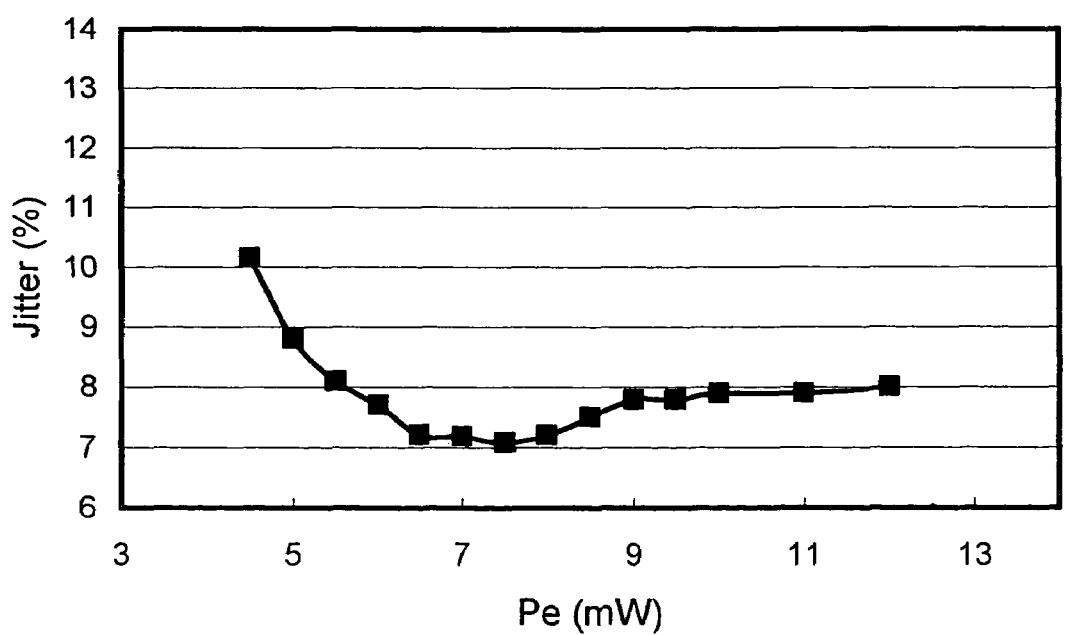
FIG. 8 is a graph showing how jitter varies with magnitude of erasing power Pe at recording linear velocity of 3.5 m/sec.

FIG. 8 is a graph showing how jitter varied with magnitude of the erasing power Pe at the recording linear velocity of 3.5 m/sec. As shown in FIG. 8, when the recording linear velocity was 3.5 m/sec, it was found that the jitter was lowest when the erasing power Pe was about 7 mW (about 1.56 times the level at which the highest reflection coefficient saturated).

Thus, it was confirmed that when data were recorded (overwritten) in the optical recording medium at the recording linear velocity of 3.5 m/sec, a good direct overwriting characteristic was obtained by setting the erasing power Pe slightly higher than the level at which the highest reflection coefficient saturated.

Working Example 2

The highest reflection coefficient was measured using the optical recording medium sample used in Working Example 1 in the manner of Working Example 1, except that the recording conditions shown in Table 2 were employed. As shown in Table 2, the recording linear velocity was 7.0 m/sec (DVD double velocity).

TABLE 2

| | |
|---|---|
| Clock frequency | 52.32 MHz |
| Clock period (1T) | 19.1 nsec |
| Linear velocity | 7.0 m/sec |
| Modulation method | 8, 16 modulation |
| Data transfer rate (considering efficiency) | 22.16 Mbps |
| Channel bit length | 0.133 µm |
| Numerical aperture (NA) | 0.6 |
| Wavelength of a laser beam | 660 nm |

Figure 9:
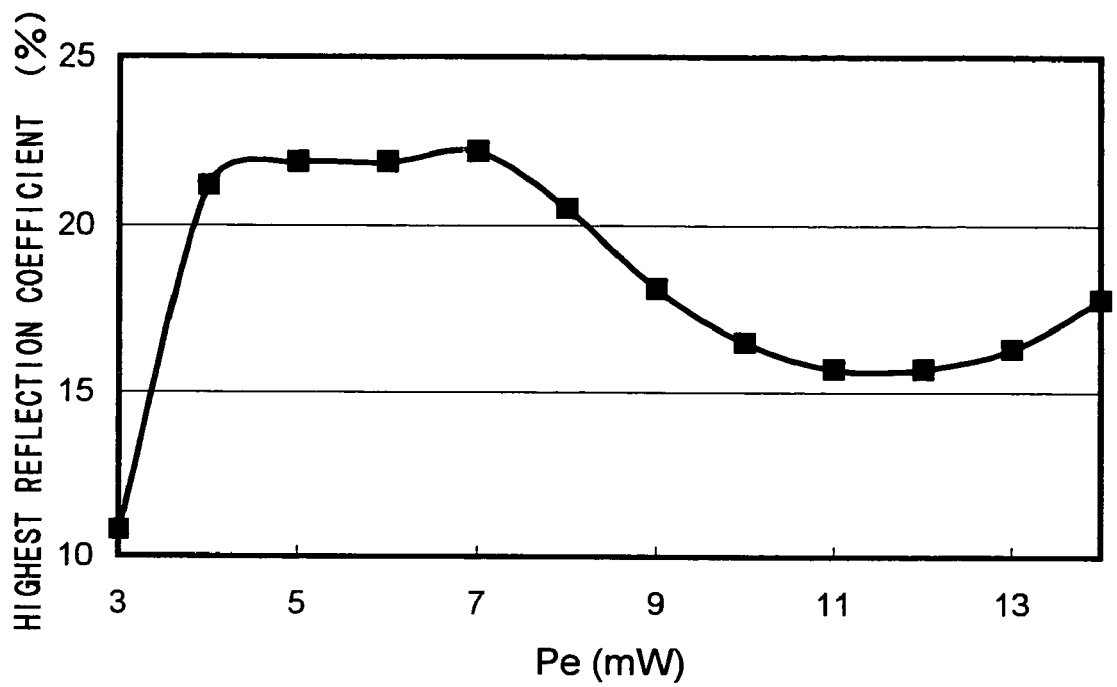
FIG. 9 is a graph showing how the highest reflection coefficient varies with magnitude of erasing power Pe at recording linear velocity of 7.0 m/sec.

FIG. 9 is a graph showing how the highest reflection coefficient varied with magnitude of the erasing power Pe at the recording linear velocity of 7.0 m/sec. As shown in FIG. 9, when the recording linear velocity was 7.0 m/sec, the highest reflection coefficient did not change substantially in the area where the erasing power Pe was about 4 mW to about 7 mW but the highest reflection coefficient decreased as the erasing power Pe increased in the area where the erasing power Pe was about 7 mW to about 11 mW, while the reflection coefficient increased as the erasing power Pe increased in the area where the erasing power Pe was equal to or higher than about 11 mW. Therefore, it was found that the relationship between the erasing power Pe and the highest reflection coefficient was similar to that shown in FIG. 2.

Figure 10:
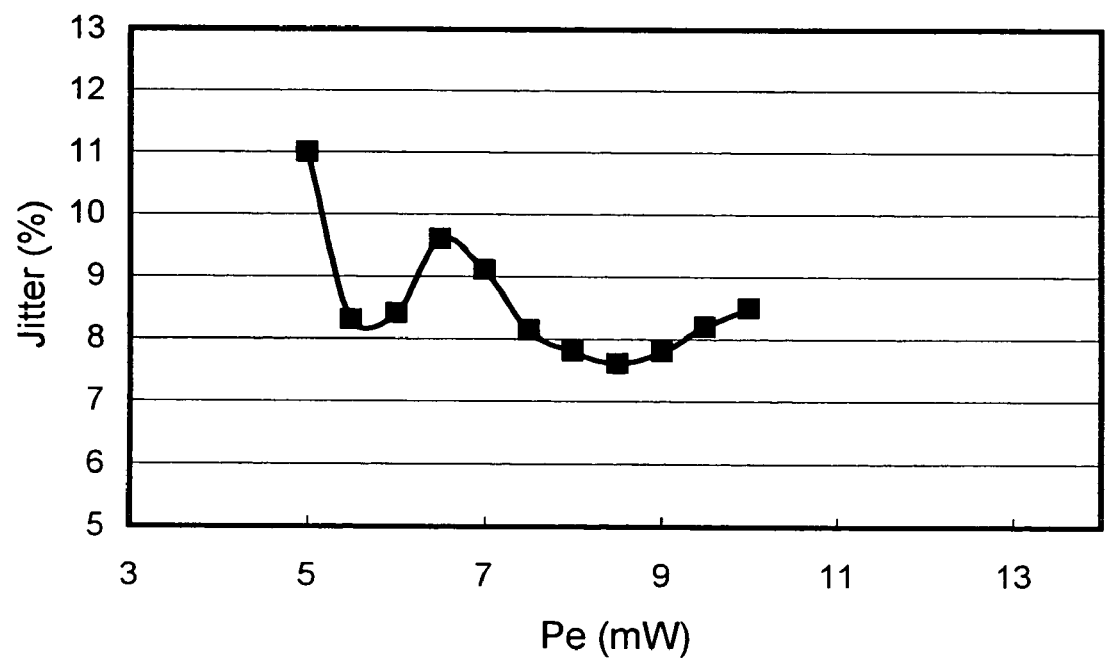
FIG. 10 is a graph showing how jitter varies with magnitude of erasing power Pe at recording linear velocity of 7.0 m/sec.

FIG. 10 is a graph showing how jitter varied with magnitude of the erasing power Pe at the recording linear velocity of 7.0 m/sec. As shown in FIG. 10, when the recording linear velocity was 7.0 m/sec, the jitter assumed a low value at two areas. Further, the jitter in the area where the erasing power Pe was higher, namely, about 7.5 to 9.5 mW, was lower than that in the area where the erasing power Pe was lower, namely, about 5.5 to 6.0 mW, and the jitter was lowest when the erasing power Pe was about 8.5 mW.

It can be seen from FIG. 10 that the erasing power Pe of 8.5 mW at which the jitter was lowest is included in the area ③-A where the highest reflection coefficient decreased as the erasing power Pe increased.

Thus, it was confirmed that when data were recorded (overwritten) in the optical recording medium at the recording linear velocity of 7.0 m/sec, a good direct overwriting characteristic was obtained by setting the erasing power Pe to a level within the area where the highest reflection coefficient decreased as the erasing power Pe increased.

The invention claimed is:

1. A method for recording data in an optical recording medium for forming record marks in a recording layer containing a phase change material by modulating the power of a laser beam between a plurality of power levels including at least erasing power wherein the erasing power is set to a first level when data are to be recorded at a first linear velocity and the erasing power is set to a second level different from the first level when data are to be recorded at a second linear velocity higher than the first linear velocity, wherein the first linear velocity is set so that the reflection coefficient of the region between neighboring recording marks becomes substantially saturated when the erasing power is set to be equal to or higher than a predetermined level and the second linear velocity is set so that the reflection coefficient of the region between the neighboring record marks approaches the reflection coefficient of the record mark as the erasing power increases when data are recorded at the second linear velocity.

2. A method for recording data in an optical recording medium for forming record marks in a recording layer containing a phase change material by modulating the power of a laser beam between a plurality of power levels including at least erasing power wherein the erasing power is set to a first level when data are to be recorded at a first linear velocity and the erasing power is set to a second level different from the first level when data are to be recorded at a second linear velocity higher than the first linear velocity, wherein the first level is set so that the reflection coefficient of the region between the neighboring record marks becomes equal to a first value and the second level is set so that the reflection coefficient of the region between the neighboring record marks becomes equal to a second value closer to the reflection coefficient of the record mark than the first value is.

3. A method for recording data in an optical recording medium in accordance with claim 1 wherein the first level is set so that the reflection coefficient of the region between the neighboring record marks becomes equal to a first value and the second level is set so that the reflection coefficient of the region between the neighboring record marks becomes equal to a second value closer to the reflection coefficient of the record mark than the first value is.

4. A method for recording data in an optical recording medium in accordance with claim 1 wherein the optical recording medium is constituted as a "high-to-low" type and the second linear velocity is set so that the reflection coefficient of the region between the neighboring record marks decreases as the erasing power increases.

5. A method for recording data in an optical recording medium in accordance with claim 2 wherein the optical recording medium is constituted as a "high-to-low" type and the second linear velocity is set so that the reflection coefficient of the region between the neighboring record marks decreases as the erasing power increases.

6. A method for recording data in an optical recording medium in accordance with claim 3 wherein the optical recording medium is constituted as a "high-to-low" type and the second linear velocity is set so that the reflection coefficient of the region between the neighboring record marks decreases as the erasing power increases.

7. An optical recording medium provided with a recording layer which contains a phase change material and in which record marks are to be formed by irradiation with a laser beam, and with first predetermined information necessary for setting a level of an erasing power corresponding to a first recording linear velocity and second predetermined information necessary for setting a level of the erasing power corresponding to a second recording linear velocity higher than the first recording linear velocity, wherein when data are recorded at the first recording linear velocity, the reflection coefficient of the region between the neighboring record marks becomes equal to a first value and when data are recorded at the second recording linear velocity, the reflection coefficient of the region between neighboring record marks becomes equal to a second value that is closer to the reflection coefficient of the record mark than the first value is.

8. A method for recording data in an optical recording medium for forming record marks in a recording layer containing a phase change material by modulating the power of a laser beam between a plurality of power levels including at least erasing power, the method comprising:

setting the erasing power to a first level when data are to be recorded at a first linear velocity, the first linear velocity being set so that the reflection coefficient of the region between neighboring recording marks becomes substantially saturated when the erasing power is set to be equal to or higher than a predetermined level; and setting the erasing power to a second level different from the first level when data are to be recorded at a second linear velocity higher than the first linear velocity, the second linear velocity being set so that the reflection coefficient of the region between the neighboring record marks approaches the reflection coefficient of the record mark as the erasing power increases when data are recorded at the second linear velocity.

9. A method for recording data in an optical recording medium for forming record marks in a recording layer containing a phase change material by modulating the power of a laser beam between a plurality of power levels including at least erasing power, the method comprising:

setting the erasing power to a first level when data are to be recorded at a first linear velocity, the first power level being set so that the reflection coefficient of the region between the neighboring record marks becomes equal to a first value;

setting the erasing power to a second level different from the first level when data are to be recorded at a second linear velocity higher than the first linear velocity, the second power level being set so that the reflection coefficient of the region between the neighboring record marks becomes equal to a second value closer to the reflection coefficient of the record mark than the first value.

10. A method for recording data in an optical recording medium in accordance with claim 9 wherein the optical recording medium is constituted as a high-to-low type and the second linear velocity is set so that the reflection coefficient of the region between the neighboring record marks decreases as the erasing power increases.

* * * * *